United States Patent [19]

Srivastava

[11] Patent Number: 4,764,810
[45] Date of Patent: Aug. 16, 1988

[54] HORIZONTAL PHASE LOCKED LOOP SYSTEM

[75] Inventor: Gopal K. Srivastava, Arlington Heights, Ill.

[73] Assignee: Zenith Electronics Corporation, Glenview, Ill.

[21] Appl. No.: 12,228

[22] Filed: Feb. 9, 1987

[51] Int. Cl.[4] .............................................. H04N 5/04
[52] U.S. Cl. ..................................... 358/148; 358/158
[58] Field of Search ......................... 358/148, 158, 159

[56] References Cited

U.S. PATENT DOCUMENTS 4,093,963 6/1978 Uchida .................................. 358/158

FOREIGN PATENT DOCUMENTS 0093487 7/1981 Japan .................................... 358/158

Primary Examiner—James J. Groody
Assistant Examiner—David E. Harvey

[57] ABSTRACT

A horizontal phase locked loop includes a horizontal phase detector having a current source transistor with a pair of resistors connected across its base-emitter circuit. A switching transistor, supplied with an input signal during the vertical blanking interval, is coupled across one of the resistors for shorting out that resistor during the non-vertical blanking interval. The current from the source transistor is increased during the vertical blanking interval which increases the gain of the phase locked loop and eliminates the hook at the top of the raster when a video signal with phase errors during vertical is received.

2 Claims, 3 Drawing Sheets

HORIZONTAL PHASE LOCKED LOOP SYSTEM

BACKGROUND OF THE INVENTION AND PRIOR ART

This invention relates generally to horizontal phase locked loop (PLL) systems and particularly to an improved PLL system for use in conjunction with a video cassette recorder (VCR).

Horizontal PLL systems are well-known in the art and comprise a horizontal phase detector, a low pass filter, an error amplifier for supplying a control signal to the horizontal oscillator circuit, and a divider network. The divider network supplies a signal that is representative of the horizontal oscillator signal back to the horizontal phase detector for comparison with the input horizontal sync signal. The horizontal oscillator in turn controls horizontal deflection of an electron beam in a cathode ray tube (CRT) in conjunction with a vertical deflection system for generating a raster on the faceplate of the CRT. The electron beam is modulated with video information to develop a video picture. As is well-known, the design of the horizontal PLL circuit represents a compromise between achieving good lock-in capability for weak signals and minimizing horizontal jitter.

When a VCR is used as a television signal source, horizontal PLL circuits that are designed for optimum operation with conventional television signals may experience difficulties due to variation in the time base of the VCR signal. Stretching of the tape is one example of how such a time base error is introduced into the VCR signal output. The result of such a time base error is that the PLL circuit may not lock in immediately after the vertical blanking interval. This shows up as a "hook" or bending at the top of the raster, with the severity of the hook varying with the amount of time base error in the tape source. Such a hook in the display can be very disturbing to a viewer and is clearly not desirable.

One means for eliminating such a hook is to decrease the PLL response time, that is, increase the gain of the PLL circuit, when the receiver is used with signal sources that are prone to time base errors. A viewer-controlled switch may be provided for this purpose. Since VCR signals are generally carried on either television VHF channels 3 or 4, one prior art solution automatically changes the horizontal PLL response time when either channel 3 or channel 4 is selected on the television receiver. While these prior art solutions are effective, they either entail additional cost or are inconvenient. Accordingly, there is a need in the art for a simple, automatic correction to compensate for VCR signal time base errors.

OBJECTS OF THE INVENTION

A principal object of the invention is to provide a novel horizontal PLL system.

Another object of the invention is to provide a horizontal PLL system that is operable over a wide range of signal frequency variation without instability.

A further object of the invention is to provide a horizontal PLL system that eliminates the hook at the top of the raster due to VCR signals with time base errors.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
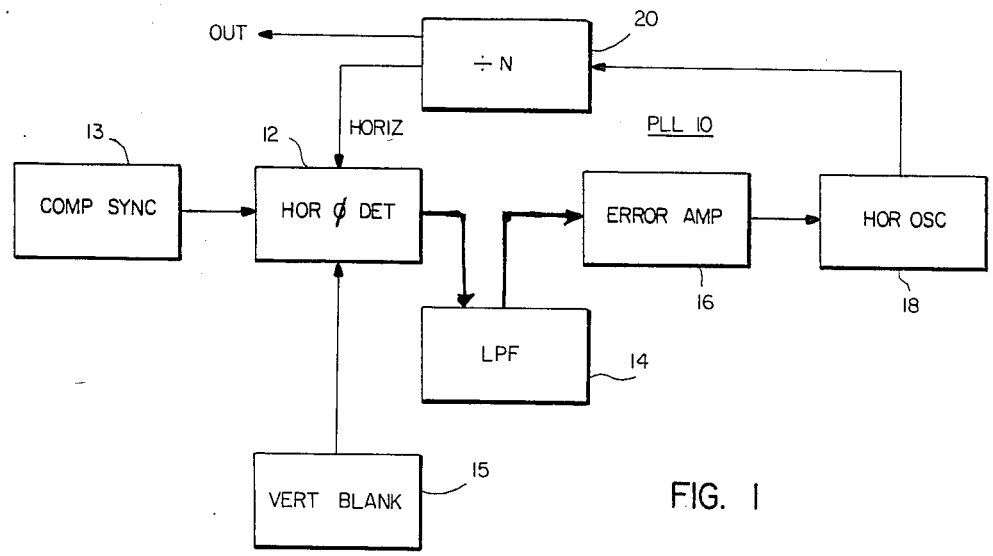
FIG. 1 is a partial block diagram of a horizontal PLL circuit constructed in accordance with the invention.

Referring to FIG. 1, a horizontal PLL circuit 10 includes a horizontal phase detector 12 that is supplied with a source of composite sync signal 13. The composite sync signal conventionally includes a series of pulses at a horizontal frequency rate that increase in width during the vertical blanking interval of the television signal. The output of horizontal phase detector 12 is supplied to a low pass filter 14 and to an error amplifier 16. The low pass filter defines the gain/frequency response of the PLL circuit and the error amplifier amplifies the error signal developed and applies it to a horizontal oscillator 18 for controlling the frequency thereof. The output of the horizontal oscillator 18 is supplied to a divider circuit 20 to produce a signal at horizontal frequency which is supplied back to phase detector 12 and to circuitry (not shown) for developing horizontal deflection signals. In the illustration, the horizontal oscillator in circuit 18 develops a signal that is N times the actual horizontal frequency ultimately used. A vertical blanking signal 15 is also applied to the horizontal phase detector 12. As will be seen, the vertical blanking signal is used to increase the gain of the horizontal phase detector 12 substantially only during the vertical blanking interval, when no video is displayed, and is not applied during "video time." The vertical blanking pulse speeds up the PLL response time during the blanking interval (when no signal is present) and the PLL response is thus faster for the duration of the vertical blanking interval. The PLL thus rapidly corrects any VCR signal time base error and eliminates the hook in the top of the raster. For the remainder of the video time, the PLL response returns substantially to normal so that there is essentially no compromise with respect to horizontal jitter. Thus, with the circuit of the invention, the hook is eliminated without otherwise adversely affecting the displayed image.

Figure 2:
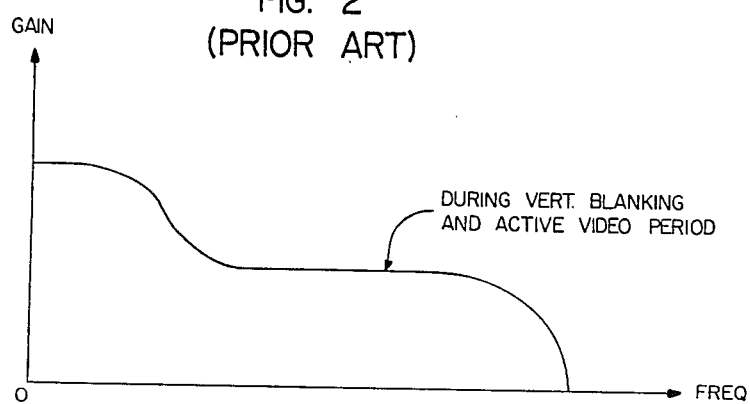
FIG. 2 is a plot of the gain/frequency characteristic of a prior art PLL.

FIG. 2 illustrates the frequency and gain response of the PLL system of the prior art, and as can be seen, it has only one response. Therefore, in prior art PLLs, the frequency response like Plot B cannot be selected without adversely affecting the displayed image for weak and noisy signals.

Figure 3:
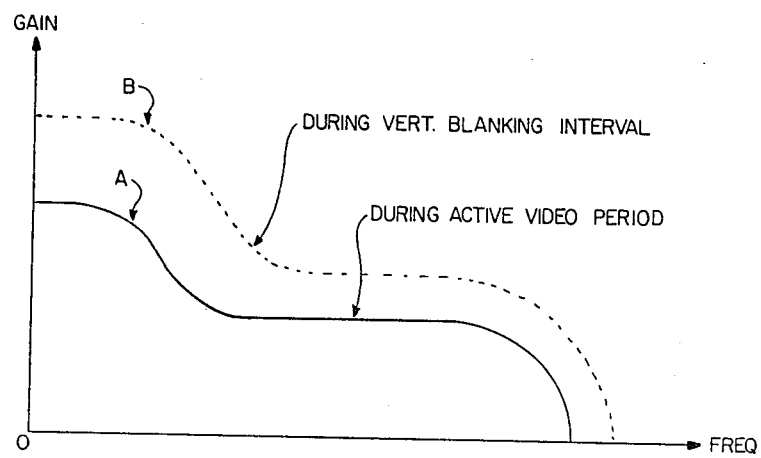
FIG. 3 is a pair of waveforms showing comparing the gain/frequency characteristics of the PLL of the invention during vertical blanking and video time.

In FIG. 3, the plots of gain/frequency for the horizontal PLL circuit of the present invention are shown. Plot A shows the frequency/gain response of the PLL during non-vertical blanking interval, that is, the active video period, and Plot B during vertical blanking interval. Plot B has a higher gain and a wider frequency response than Plot A, thereby making it possible for the PLL to correct the phase error introduced by a VCR signal or any other source during vertical blanking time, thus eliminating the top hook.

Figure 4:
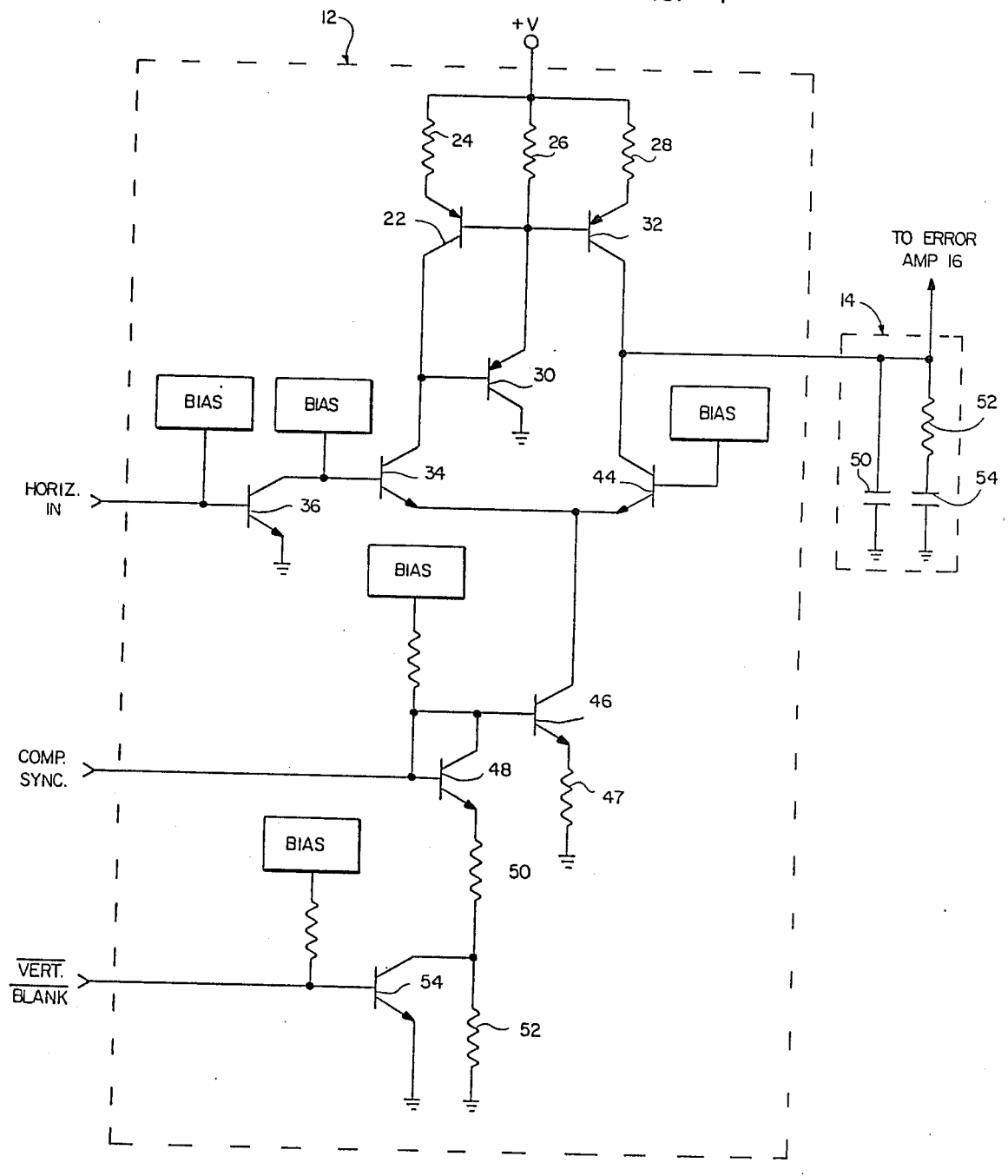
FIG. 4 is a partial schematic diagram of a horizontal phase detector constructed in accordance with the invention.

In FIG. 4, the dashed line blocks 12 and 14 encircle components that are part of the horizontal phase detector and low pass filter, respectively. Three input signals are supplied to horizontal phase detector 12. One is the horizontal signal, another the composite sync signal and the third, an inverted vertical blanking signal. Phase detector 12 includes a pair of PNP transistors 22 and 32 connected in differential fashion with emitter resistors 24 and 28, respectively, being connected to a source of +V potential. The bases of transistors 22 and 32 are connected together and to +V through a resistor 26. A PNP transistor 30 has its emitter connected to the bases of transistors 22 and 32, its collector connected to ground and its base connected to the collector of transistor 22. Another differentially connected pair of transistors consists of an NPN transistor 34 and an NPN transistor 44 having their collectors respectively connected to the collectors of transistors 22 and 32. Their emitters are connected together and to the collector of an NPN transistor 46, the emitter of which is connected to ground through a resistor 47. The base of transistor 34 is coupled to the collector of an NPN transistor 36 having a grounded collector and a base that is supplied with the horizontal input signal. The bases of transistors 34, 36 and 44 are individually coupled to suitable bias networks as indicated. The base of transistor 46 is connected to the collector of an NPN transistor 48 having its emitter connected to ground through a series connection of resistors 50 and 52. The base of transistor 48 is connected to its collector and to a bias network and receives the composite sync signal. The junction of resistors 50 and 52 is connected to the collector of an NPN transistor 54 having a grounded emitter and a base that is connected to a bias source and receives the inverted vertical blanking signal. The output of the horizontal phase detector is taken from the collectors of transistors 32 and 44 and is supplied to low pass filter 14. Low pass filter 14 includes a small capacitor 50, that is connected to ground and in parallel with the series connection of a resistor 52 and a larger capacitor 54, that is connected to ground. The output of low pass filter 14 is supplied to error amplifier 16.

In operation, and ignoring for the moment transistor 54 that is connected to the junction of resistors 50 and 52, a certain stable current exists at the collectors of transistors 32 and 44, which current is determined by the required bias for the horizontal oscillator (not shown). The composite sync signal input to the base of transistor 48, which is operated as a diode, develops current flow in resistors 50 and 52 and in resistor 47 of transistor 46. Since transistor 46 functions as a current source for the differentially connected transistors, the magnitude of the current output from the transistors 32 and 44 will be affected by a change in the current flow in transistor 46. A change in that current flow is produced by virtue of the connection of the inverted vertical blanking signal to the base of transistor 54, which has its collector connected to the junction of resistors 50 and 52. Transistor 54, which is normally conductive, is driven non-conductive during the vertical blanking interval to effectively add resistor 52 in series with resistor 50 and thereby change the division of current between transistors 48 and 46. The result is that the collector current of transistor 46 is increased, thus increasing the gain of the phase detector during the vertical blanking interval.

Figure 5:
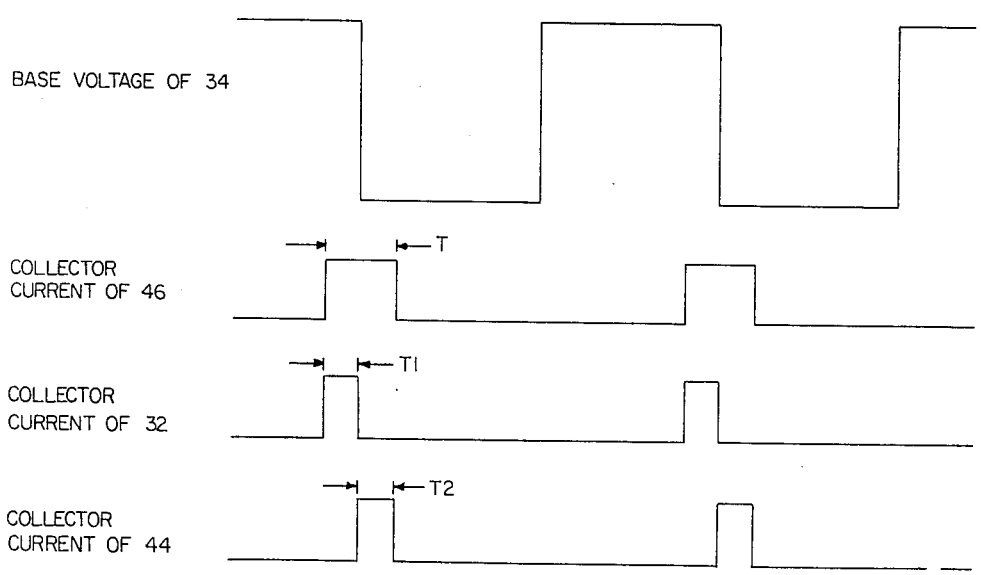
FIG. 5 is a series of waveforms showing operation of the PLL.

FIG. 5 is a timing diagram, which shows the important timing relationship between the various signals encountered in the operation of the horizontal phase detector of FIG. 4. The T1 is the conduction time of transistor 32 and T2 is the conduction time of transistor 44. Vpd is the correction voltage developed, during each horizontal period, by the phase detector on the lowpass filter 14. If resistors 24 and 28 are equal and transistors 22 and 32 are matched, the collector currents of transistors 32 and 44 are equal to the collector current of transistor 46. Therefore, $$Vpd = \frac{Ic46}{(C54 + C50)} \times (T1 - T2) \quad (1)$$

From equation (1), we observe that if composite sync and horizontal signal are in phase, then T1=T2 and Vpd=0. However, if the above two are not in phase, then Vpd is proportional to the phase error, T1−T2.

From equation (1), we also observe that Vpd, the error voltage developed per horizontal sync period is also proportional to the Ic46, the collector current of transistor 46. In this invention, the collector current of the transistor 46 is increased during the vertical blanking interval, thereby causing the PLL response to change from Plot A to Plot B in FIG. 3. During video, the gain of the PLL is substantially back to normal and normal PLL operation ensues. However, for the duration of the vertical interval, the PLL gain is significantly higher than normal and is able to rapidly compensate for the time base error in the VCR signal, which occurs during the vertical blanking. The hook at the top of the raster is, therefore, eliminated with the inventive circuit while PLL operation during the rest of the video display is substantially unaffected.

It is recognized that numerous changes and modifications in the described embodiment of the invention will be apparent to those skilled in the art without departing from its true spirit and scope. The invention is to be limited only as defined in the claims.

What is claimed is:

1. A horizontal phase locked loop comprising:

a horizontal oscillator;

a horizontal phase detector, including a current source transistor, and having a composite sync signal input;

a low pass filter coupled to the output of said horizontal phase detector for driving said horizontal oscillator;

a feedback signal being coupled from said horizontal oscillator to said horizontal phase detector for comparison with said composite sync signal input;

means, including a transistor switch, for supplying a vertical blanking signal to said horizontal phase detector for affecting the gain of said phase locked loop, by changing the current flow in said current source transistor, during the vertical blanking interval of said composite sync signal; and a pair of resistors connected across the base-emitter circuit of said current source transistor, said transistor switch having an input coupled to receive said vertical blanking signal and an output coupled to the junction of said pair of resistors for shorting out one of said pair of resistors during the non-vertical blanking interval of said composite sync signal.

2. A horizontal phase locked loop comprising:
a horizontal phase detector having two inputs and an output;
means supplying a composite sync signal to one of said two inputs;
a low pass filter and a horizontal oscillator coupled to said output;
means supplying a signal related to the frequency of said horizontal oscillator to the other of said two inputs of said horizontal phase detector;
a transistor in said horizontal phase detector establishing the gain thereof during vertical blanking;
a pair of resistors coupled to the input of said transistor; and
means comprising a switch transistor connected across one of the resistors in said pair and driven non-conductive in response to a vertical blanking signal for increasing the gain of said horizontal phase detector during vertical blanking.

* * * * *